(12) United States Patent
Shi et al.

(10) Patent No.: US 11,739,650 B2
(45) Date of Patent: Aug. 29, 2023

(54) HYBRID AIRFOIL COATINGS

(71) Applicants: Rolls-Royce Corporation, Indianapolis, IN (US); Rolls-Royce North American Technologies, Inc., Indianapolis, IN (US)

(72) Inventors: Jun Shi, Carmel, IN (US); John Alan Weaver, Indianapolis, IN (US); Li Li, Carmel, IN (US); Ann Bolcavage, Indianapolis, IN (US); Matthew R. Gold, Carmel, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 784 days.

(21) Appl. No.: 16/286,047

(22) Filed: Feb. 26, 2019

(65) Prior Publication Data

US 2020/0024977 A1   Jan. 23, 2020

Related U.S. Application Data

(60) Provisional application No. 62/635,874, filed on Feb. 27, 2018.

(51) Int. Cl.
*F01D 5/28* (2006.01)
*F01D 5/14* (2006.01)
*C04B 41/52* (2006.01)
*C04B 41/89* (2006.01)

(52) U.S. Cl.
CPC .............. *F01D 5/288* (2013.01); *C04B 41/52* (2013.01); *C04B 41/89* (2013.01); *F01D 5/147* (2013.01); *F05B 2260/202* (2013.01); *F05D 2230/31* (2013.01); *F05D 2230/90* (2013.01)

(58) Field of Classification Search
CPC . F05D 2230/90; C04B 41/89; C04B 41/4572; C04B 41/74; C04B 41/76; C23C 4/01; C23C 4/02; F01D 5/288
See application file for complete search history.

(56) References Cited

U.S. PATENT DOCUMENTS 4,576,874 A * 3/1986 Spengler ................... C23C 4/11
                                                                    428/623
4,616,975 A * 10/1986 Duncan .................... F01D 9/041
                                                                    415/181

(Continued)

*Primary Examiner* — Woody A Lee, Jr.
*Assistant Examiner* — Wesley Le Fisher
(74) *Attorney, Agent, or Firm* — Shumaker & Sieffert, P.A.

(57) ABSTRACT

The disclosure describes articles and techniques that include an airfoil having a hybrid coating system to provide improved particle impact resistance and improve CMAS attack resistance on the pressure side of the airfoil and improved thermal load protection on the suction side of the airfoil. An example article for a gas turbine engine may include a substrate, and a hybrid environmental barrier coating (EBC) including a relatively dense EBC layer on a first portion of the substrate and a relatively porous EBC layer on a second portion of the substrate, where the first portion of the substrate is different from the second portion of the substrate, and wherein at least a portion of the relatively porous EBC layer overlaps at least a portion of the relatively dense EBC layer in an overlap region.

12 Claims, 3 Drawing Sheets

(56) References Cited

U.S. PATENT DOCUMENTS

| | | | | |
|---|---|---|---|---|
| 5,480,285 A * | 1/1996 | Patel | ............... | F01D 5/141 |
| | | | | 416/223 A |
| 7,597,966 B2 * | 10/2009 | Spitsberg | ............... | C23C 28/321 |
| | | | | 416/241 B |
| 8,511,993 B2 * | 8/2013 | Kemppainen | ............... | C23C 4/134 |
| | | | | 416/241 B |
| 2009/0038935 A1 | 2/2009 | Floyd et al. | | |
| 2011/0038710 A1 | 2/2011 | Kemppainen et al. | | |
| 2016/0298467 A1 * | 10/2016 | Ucasz | ............... | C23C 4/134 |
| 2016/0305319 A1 * | 10/2016 | Baldiga | ............... | C04B 41/89 |
| 2017/0016335 A1 * | 1/2017 | Kirby | ............... | F01D 5/284 |

* cited by examiner

HYBRID AIRFOIL COATINGS

This application claims the benefit of U.S. Provisional Application No. 62/635,874, filed Feb. 27, 2018, which is incorporated herein by reference in its entirety.

TECHNICAL FIELD

The present disclosure generally relates to systems and techniques for hybrid airfoil coatings.

BACKGROUND

The components of gas turbine engines operate in severe environments. For example, the high-pressure turbine airfoils exposed to hot gases in commercial aeronautical engines typically experience surface temperatures of about 1000° C. Components of high-temperature mechanical systems may include a superalloy substrate, a ceramic substrate, or a ceramic matrix composite (CMC) substrate. In many examples, the substrates may be coated with one or more coatings to modify properties of the surface of the substrate. For example, superalloy, ceramic, or CMC substrates may be coated with a thermal barrier coating to reduce heat transfer from the external environment to the superalloy substrate, an environmental barrier coating to reduce exposure to environmental species, such as oxygen, water vapor, or calcium magnesium alumino-silicate (CMAS) containing materials, or both. Additionally, certain components may include other functional coatings, such as, for example, bond coatings to improve adhesion between the substrate and adjacent coating layers, abradable coatings for forming seals between moving parts, and abrasive coatings to provide toughness to moving components that may contact abradable coatings.

SUMMARY

In some examples, the disclosure describes an article for a gas turbine engine that includes a substrate, and a hybrid environmental barrier coating (EBC) including a relatively dense EBC layer on a first portion of the substrate and a relatively porous EBC layer on a second portion of the substrate, where the first portion of the substrate is different from the second portion of the substrate, and wherein at least a portion of the relatively porous EBC layer overlaps at least a portion of the relatively dense EBC layer in an overlap region.

In some examples, the disclosure describes a method of forming an article for a gas turbine engine that includes forming a relatively dense EBC layer on a first portion of a substrate and forming a relatively porous EBC layer on a second portion of the substrate, where the first portion of the substrate is different from the second portion of the substrate, and wherein at least a portion of the relatively porous EBC layer overlaps at least a portion of the relatively dense EBC layer in an overlap region.

The details of one or more examples are set forth in the accompanying drawings and the description below. Other features, objects, and advantages will be apparent from the description and drawings, and from the claims.

DETAILED DESCRIPTION

Figure 1:
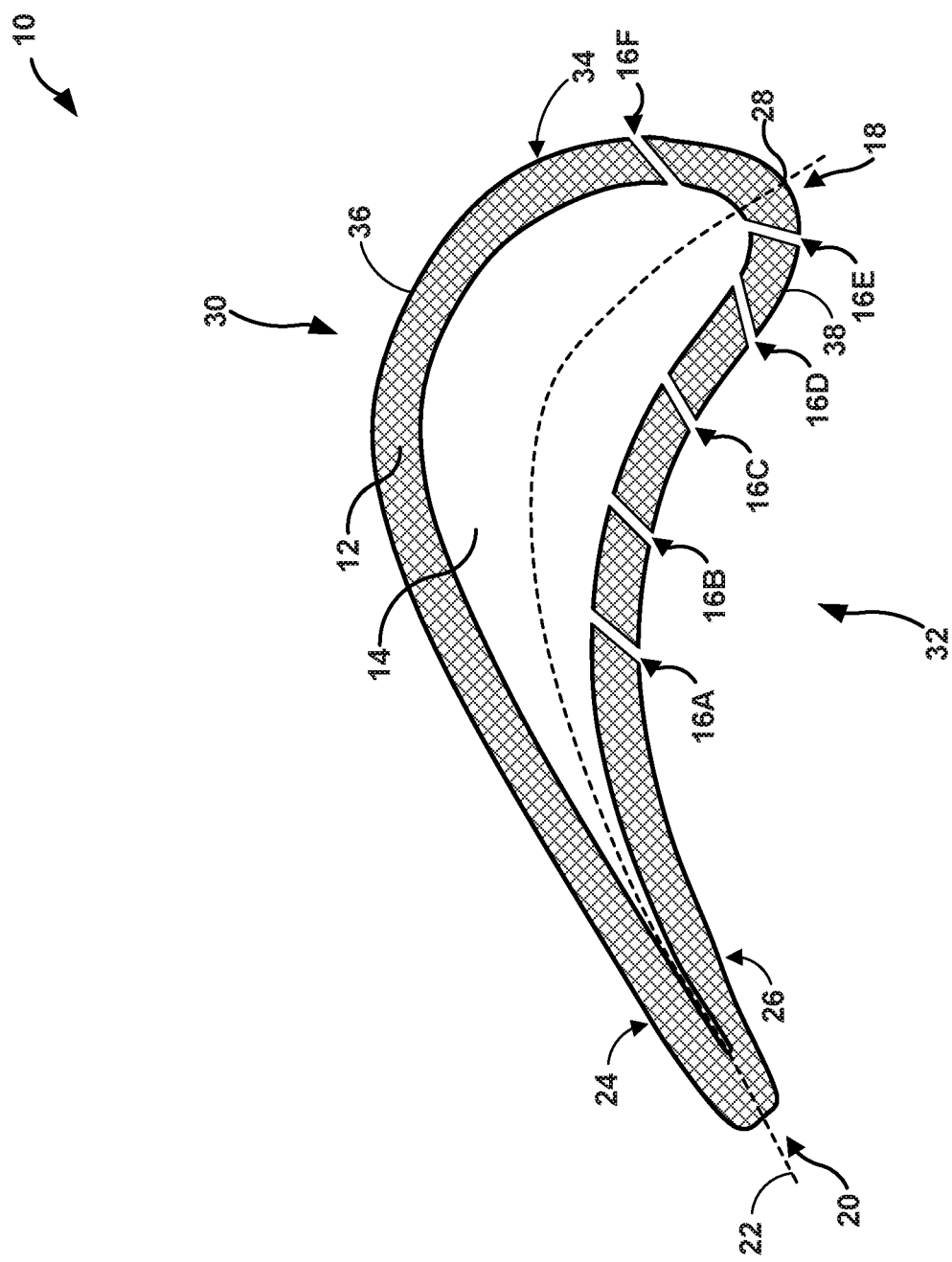
FIG. 1 is conceptual and schematic diagram illustrating a cross-sectional view of an example airfoil that includes a hybrid coating.

The disclosure describes articles and techniques that include an airfoil having a hybrid coating system to provide improved particle impact resistance and improve CMAS attack resistance on the pressure side of the airfoil and improved thermal load protection on the suction side of the airfoil. The hybrid coating system includes a relatively dense EBC on the pressure side and a relatively porous EBC on the suction side. During operation, gas turbine engine components, e.g., airfoils, are subject to one or more of particle impact, CMAS attack, and thermal loading. For example, gases flowing around an airfoil may form a stagnation point near the leading edge of the airfoil. The stagnation point may define an intersection of a pressure side of the airfoil and a suction side of the airfoil. With respect to CMAS attack, CMAS particles, such as dust containing CMAS species, in the intake air may melt at the operating temperature of the gas turbine engine. The molten CMAS particles may impact and deposit on the airfoil due to the inertial force on the CMAS particles. The molten CMAS particles may interact mechanically, chemically, or both with a surface of the airfoil (e.g., the substrate of the airfoil or coatings on the substrate) and cause premature failure of coatings on the surface. Because inertia forces are typically greater on the pressure side of the airfoil, the pressure side may be more prone to particle impact and CMAS attack.

With respect to thermal loading, the peak heat load is typically located near the stagnation point on the suction side of the airfoil. For example, the suction side of the airfoil near the stagnation point may experience higher local flow velocities, which limit use of film cooling holes near this location in order to reduce aerodynamic losses. Because of the limitation of film cooling holes, the suction side may be more prone to high thermal loading.

The hybrid coating described herein may help address one or more of these issues. The relatively dense EBC is more resistant to particle impact and CMAS attack compared to the relatively porous EBC. The relatively porous EBC has a lower thermal conductivity and thereby improved protection from the thermal loading compared to the relatively dense EBC. Further, an edge of the relatively porous EBC layer overlaps an edge of the relatively dense EBC layer in an overlap region. A smooth transition in the overlap region (e.g., substantially symmetric overlapping tapers of the relatively dense EBC layer and the relatively porous EBC layer with a substantially uniform coating thickness) improved the durability of the overlap region. For example, a smooth transition reduces delamination of the relatively porous EBC layer from the relatively dense EBC layer. By including a relatively porous EBC layer on a suction side of an airfoil that overlaps at least a portion of a relatively dense EBC layer on the pressure side of the airfoil, the disclosed articles and techniques provide a hybrid coating with improved particle impact resistance, CMAS attack resistance, and high thermal loading resistance compared to coating systems without a relatively porous EBC layer that overlaps at least a portion of the relatively dense EBC layer.

FIG. 1 is conceptual and schematic diagram illustrating a cross-sectional view of an example component 10 for a gas turbine engine. Component 10 includes substrate 42. Substrate 12 may define cavity 14. Substrate 42 may include a superalloy substrate, a ceramic substrate, a CMC substrate, or the like. Although shown in FIG. 1 as a hot section airfoil of a gas turbine engine, in other examples, component 10 may be another component of a gas turbine engine, such as a blade track, a blade, a vane, a combustion chamber liner, or the like, of a gas turbine engine. Further, although component 10 is illustrated as a single walled component, in other examples, component 10 may be a dual walled component, e.g., may include a spar and coversheet that defines an outer wall of the dual walled component.

In examples in which component 10 is an airfoil, component 10 includes a leading edge 18 and a trailing edge 20. Camber line 22 (e.g., mean line) is the locus of points midway between the upper surface 58 and lower surface 26 extending from leading edge 18 to trailing edge 20. Stagnation point 28 may be defined by the position at or near leading edge 18 where, during operation of the gas turbine engine, the velocity of gas flow at the surface of component 10 is at a minimum or substantially zero. Although stagnation point 28 is shown in FIG. 1 at camber line 22, in other examples, stagnation point 28 may be in a different location. In some examples, stagnation point 18 defines an intersection of the suction side 30 of component 10 and pressure side 32 of component 10. For example, in FIG. 1, suction side 30 of component 10 includes the side of substrate 42 (e.g., upper surface 58) above camber line 22. Similar, pressure side 32 of component 10 includes the side of substrate 42 (e.g., lower surface 26) below camber line 22. Generally, during operation of component 10, suction side 30 is associated with higher local velocity and lower static pressure compared to pressure side 32, and pressure side 32 is associated with a higher static pressure and lower local velocity compared to suction side 30.

As discussed above, pressure side 32 may be more prone to particle impact and, thus, CMAS attack due to the relatively higher static pressure on pressure side 32. Pressure side 32 includes a relatively dense EBC layer 38, e.g., compared to a relatively porous EBC layer 36 on suction side 30. Relatively dense EBC layer 38 may increase particle impact resistance and CMAS attack resistance of component 10 on pressure side 32.

Component 10 includes film cooling holes 16A, 16B, 16C, 16D, and 16E (collectively, "film cooling holes 16"). In other examples, component 10 may not include film cooling holes 16, or may include more or fewer film cooling holes 16. Film cooling holes 16 may expel cooling fluid (e.g., air) from cavity 14 through a respective film cooling hole of film cooling holes 16 to the exterior of component 10. In this way, film cooling holes 16 help regulate temperature of component 10.

Placement of film cooling holes 16 may be limited. For example, aerodynamic mixing loss may be higher when cooling air is ejected into the fast-moving external gas flow on suction side 30 compared to on pressure side 32. In some examples, film cooling holes 16 may be limited to areas at or below aerodynamic throat 34 (e.g., in a direction from aerodynamic throat 34 toward stagnation point 28). Due to the limited area available for film cooling holes 16, suction side 30 may experience high thermal loading. Suction side 30 includes a relatively porous EBC layer 36, e.g., compared to a relatively dense EBC layer 38 on pressure side 32. Relatively porous EBC layer 36 has a relatively lower thermal conductivity (e.g., compared to relatively dense EBC layer 38) to reduce transmission of heat and thermal loading of substrate 12 on suction side 30.

Figure 2:
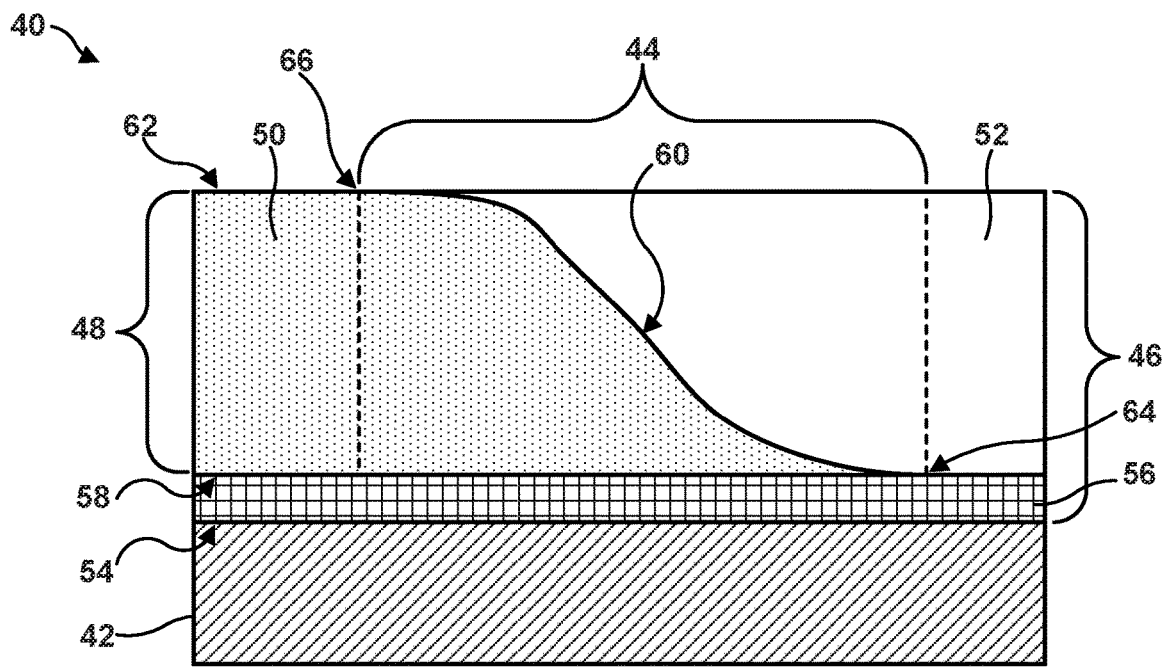
FIG. 2 is a conceptual and schematic diagram illustrating a cross-sectional view of an example article including a substrate and an overlap region of a hybrid coating.

Article 10 includes a transition between relatively dense EBC layer 38 and relatively porous EBC layer 36, which transition includes an overlap region. FIG. 2 is a conceptual and schematic diagram illustrating a cross-sectional view of an example article 40 including a substrate 42 and an overlap region 44 of a hybrid coating system 46. Article 40 may be an example of article 10, e.g., may be an airfoil. Hybrid coating system 46 includes an optional bond coat 56 and a hybrid coating layer 48 (e.g., hybrid EBC) that includes a relatively dense EBC layer 50 and a relatively porous EBC layer 52. In other examples, hybrid coating system 46 includes fewer layers, e.g., hybrid coating system 46 may include only hybrid coating layer 48, or more layers, e.g., one or more EBC layers, thermal barrier layers, abrasive coating layers, abradable coating layers, and/or CMAS resistance layers.

Substrate 42 may be a component of a high temperature mechanical system. For example, substrate 42 may be a blade track, an airfoil, a blade, a vane, a combustion chamber liner, or the like, of a gas turbine engine. In some examples, substrate 42 includes a ceramic, a ceramic matrix composite (CMC), or a superalloy. In examples in which substrate 42 includes a ceramic, the ceramic may be substantially homogeneous. The ceramic may include a silicon-containing ceramic, such as, for example: silicon oxide ($SiO_2$), silicon carbide (SiC), or silicon nitride ($Si_3N_4$); aluminum oxide ($Al_2O_3$); aluminosilicate (e.g., $Al_2SiO_5$); or the like. In examples in which substrate 42 includes a superalloy, the superalloy may include a Ni-based superalloy, a Co-based superalloy, or the like.

In examples in which substrate 42 includes a CMC, substrate 42 may include a matrix material and a reinforcement material. The matrix material may include a ceramic material, such as, for example, SiC, $Si_3N_4$, $Al_2O_3$, aluminosilicate, $SiO_2$, or the like. The reinforcement material may be continuous or discontinuous reinforcement material. For example, the reinforcement material may include discontinuous whiskers, platelets, or particulates. As other examples, the reinforcement material may include a continuous monofilament or multifilament weave. In some examples, the reinforcement material may include SiC, $Si_3N_4$, $Al_2O_3$, aluminosilicate, $SiO_2$, or the like. In some examples, substrate 42 may include a SiC—SiC CMC, in which a fibrous preform including SiC fibers is impregnated with SiC particles from a slurry, then melt infiltrated with silicon metal or a silicon alloy to form the melt-infiltrated SiC—SiC CMC.

As shown in FIG. 2, substrate 42 defines a surface 54 on which optional bond coat 56 is directly disposed. In other examples, bond coat 56 may not be disposed directly on surface 54, i.e., one or more additional intermediate layers may be disposed between substrate 42 and bond coat 56. For example, an additional intermediate bond coat layer may be disposed between substrate 42 and bond coat 56. Bond coat 56 may include a composition that provides adherence between substrate 42 and a layer formed on bond coat 56, such as hybrid coating layer 48. In some examples, the adherence provided by bond coat 56 between substrate 42 and hybrid coating layer 48 may be greater than the adherence between substrate 42 and hybrid coating layer 48, without bond coat 56.

Bond coat 56 may include silicon metal (e.g., elemental silicon; Si), a silicon-containing alloy, a silicon-containing ceramic, or a silicon-containing compound. In some examples, the presence of Si in bond coat 56 may promote adherence between bond coat 56 and substrate 42, such as, for example, when substrate 42 includes silicon metal or a silicon-containing alloy or compound.

Bond coat 56 may optionally include at least one additive. The optional at least one additive may include, for example, at least one of silicon-carbide (SiC), an oxidation enhancer, a transition metal carbide, a transition metal boride, or a transition metal nitride. SiC may affect the properties of bond coat 56. For example, SiC particles may modify oxidation resistance of bond coat 56, modify chemical resistance of bond coat 56, influence the coefficient of thermal expansion (CTE) of bond coat 56, or the like. In some examples, bond coat 56 may include between about 1 volume percent (vol. %) and about 40 vol. % SiC, such as between about 1 vol. % and about 20 vol. % SiC, or between about 5 vol. % and about 40 vol. % SiC, or between about 5 vol. % and about 20 vol. % SiC.

In examples in which bond coat 56 includes an oxidation enhancer, the oxidation enhancer may include at least one of molybdenum, hafnium, or ytterbium. In some examples in which bond coat 56 includes an oxidation enhancer, bond coat 56 may include greater than 0 wt. % and less than about 10 wt. % of the oxidation enhancer. The oxidation enhancer may facilitate formation of a stable oxide scale on a surface of bond coat 56, which may increase adhesion between bond coat 56 and hybrid coating layer 48, reduce diffusion of elements through bond coat 56, or both.

Bond coat 56 additionally or alternatively may include at least one of a transition metal carbide, a transition metal boride, or a transition metal nitride. The transition metal may include, for example, Cr, Mo, Nb, W, Ti, Ta, Hf, or Zr. The at least one transition metal carbide may include at least one of $Cr_3C_2$, $Cr_7C_3$, $Cr_{23}C_6$, $Mo_2C$, NbC, WC, TaC, HfC, or ZrC. The at least one transition metal boride may include at least one of TaB, $TaB_2$, $TiB_2$, $ZrB_2$, HfB, or $HfB_2$. The at least one transition metal nitride may include at least one of TiN, ZrN, HfN, $Mo_2N$, or TaN.

Transition metal carbides, transition metal borides, and transition metal nitrides may have a different CTE than silicon metal. For example, transition metal carbides and transition metal borides may have CTEs between about 5 parts per million per degree Celsius (ppm/° C.) and about 8 ppm/° C., and transition metal nitrides may have CTEs of about 9 ppm/° C. By mixing silicon and a transition metal carbide, a transition metal boride, or transition metal nitride, the CTE of bond coat 56 may be increased to more closely match the CTE of substrate 42, the CTE of hybrid coating layer 48, or any combination thereof. This may reduce stress at the interfaces (e.g., surface 56 and/or surface 58 defined by bond coat 56) between bond coat 56 and adjacent layers during thermal cycling of article 40.

Additionally or alternatively, the addition of the at least one of the transition metal carbide, the transition metal boride, or the transition metal nitride may improve oxidation resistance of bond coat 56 compared to a bond layer including only silicon. For example, the at least one of the transition metal carbide, the transition metal boride, or the transition metal nitride may be incorporated into a thermally grown silicon oxide on surface 58 defined by bond coat 56, which may improve adherence of the thermally grown silicon oxide to bond coat 56, decrease oxygen diffusivity through the thermally grown silicon oxide (which reduces the rate of oxidation of the remaining bond layer), or both.

In some examples, bond coat 56 may include between about 40 vol. % and about 99 vol. % silicon and a balance of the at least one of a transition metal carbide, a transition metal nitride, or a transition metal boride.

Bond coat 56 may define any suitable thickness, measured in a direction substantially normal to surface 54 of substrate 42. In some examples, bond coat 56 defines a thickness of between about 0.5 mils (about 12.7 micrometers) and about 40 mils (about 1016 micrometers), such as between about 1 mils (about 25.4 micrometers) and about 10 mils (about 254 micrometers).

Bond coat 56 may be formed on substrate 42 using, for example, thermal spraying, e.g., air plasma spraying, high velocity oxy-fuel (HVOF) spraying, low pressure plasma spraying; physical vapor deposition (PVD), e.g., electron beam physical vapor deposition (EB-PVD), directed vapor deposition (DVD), cathodic arc deposition; chemical vapor deposition (CVD); slurry process deposition; sol-gel process deposition; electrophoretic deposition; or the like.

As shown in FIG. 2, when present, bond coat 56 defines a surface 58 on which hybrid coating layer 48 is disposed. Hybrid coating layer 48 includes a first portion including a relatively dense EBC layer 50 and a second portion including a relatively porous EBC layer 52. As discussed above with respect to FIG. 1, relatively dense EBC layer 50 may be formed on a pressure side of article 40 (e.g., pressure side 32 of FIG. 1) and relatively porous EBC layer 52 may be formed on a suction side of article 40 (e.g., suction side 30 of FIG. 1). Hybrid coating layer 48 may define any suitable thickness. For example, hybrid coating layer 48 may define a thickness of between about 0.5 mils (about 12.7 micrometers) and about 40 mils (about 1016 micrometers), such as between about 1 mils (about 25.4 micrometers) and about 10 mils (about 254 micrometers).

Relatively porous EBC layer 52 overlaps at least a portion of relatively dense EBC layer 50 in overlap region 44. In examples in which article 40 is an airfoil, overlap region 44 may be positioned proximate a leading edge of the airfoil (e.g., leading edge 18), near a trailing edge of the airfoil (e.g., trailing edge 20), or both. For example, overlap region 44 may be between a stagnation point of the airfoil (e.g., stagnation point 28) and an aerodynamic throat of the airfoil (e.g., aerodynamic throat 34). In some examples, overlap region 44 may be between about 15% and about 80%, such as between about 15% and about 60%, of the distance between the stagnation point and aerodynamic throat from the stagnation point. In some examples, the thickness of hybrid coating layer 48 is substantially constant in overlap region 44. For example, relatively dense EBC layer 50 may be laterally adjacent to relatively porous EBC layer 52. Relatively porous EBC layer 52 may overlap at least a portion of relatively dense EBC layer 50 in the lateral direction to define interface 60. Interface 60 may define a smooth transition from a first position 64 on surface 58 of bond coat 56 to a second position 66 at surface 62 of hybrid coating 48. For example, interface 60 may define substantially symmetric overlapping tapers of relatively dense EBC layer 50 and the relatively porous EBC layer 52. The substantially symmetric overlapping tapers provide a substantially uniform thickness of hybrid coating 48 in overlap region 44. A smooth transition, substantially constant thickness of hybrid coating 28 in overlap region 44, or both may improve the delamination resistance of hybrid coating system 46, improve the aerodynamic performance of hybrid coating system 46, or both compared to a coating system without a smooth transition or a substantially constant overlap region thickness.

As shown in FIG. 2, interface 60 may include a sigmoidal shape. In other examples, interface 60 may include other shapes, such a substantially straight sloped line, an exponential curve, or the like. The width of overlap region 44 may be any suitable width. In some examples, a width of overlap region 44 may be between about 0.3 millimeters and about 13.0 millimeters or between about 1.0 millimeter and about 2.5 millimeters. Any one or more of the width of overlap region 44, the shape of interface 60, and the arc-length of interface 60 may be selected to reduce delamination of relatively porous EBC layer 52 from relatively dense EBC layer 50 at interface 60 during operation of article 40.

The material(s) of relatively dense EBC layer 50 and relatively porous EBC layer 52, microstructure(s) of relatively dense EBC layer 50 and relatively porous EBC layer 52, or both may be selected to perform a desired function, such as, for example, an EBC, a calcium magnesium alumino-silicate (CMAS)-resistant layer, a thermal barrier coating (TBC), an abradable layer, combinations thereof, or the like. In some examples, relatively dense EBC layer 50 and relatively porous EBC layer 52 include the same or substantially the same composition but differ in microstructure. In other examples, relatively dense EBC layer 50 and relatively porous EBC layer 52 include different compositions and different microstructures. In some examples, instead of including a single hybrid coating layer 48, article 40 may include a plurality of overlying layers, such as at least one EBC layer, at least one abradable layer, at least one TBC layer, at least one CMAS-resistant layer, or combinations thereof.

In some examples, relatively dense EBC layer 50, relatively porous EBC layer 52, or both may include at least one of a rare earth oxide, a rare earth silicate, an aluminosilicate, or an alkaline earth aluminosilicate. For example, relatively dense EBC layer 50, relatively porous EBC layer 52, or both may include mullite, barium strontium aluminosilicate (BSAS), barium aluminosilicate (BAS), strontium aluminosilicate (SAS), at least one rare earth oxide, at least one rare earth monosilicate ($RE_2SiO_5$, where RE is a rare earth element), at least one rare earth disilicate ($RE_2Si_2O_7$, where RE is a rare earth element), or combinations thereof. The rare earth element in the at least one rare earth oxide, the at least one rare earth monosilicate, or the at least one rare earth disilicate may include at least one of Lu, Yb, Tm, Er, Ho, Dy, Tb, Gd, Eu, Sm, Pm, Nd, Pr, Ce, La, Y, or Sc.

In some examples, relatively dense EBC layer 50, relatively porous EBC layer 52, or both may include at least one rare earth oxide and alumina, at least one rare earth oxide and silica, or at least one rare earth oxide, silica, and alumina. In some examples, relatively dense EBC layer 50, relatively porous EBC layer 52, or both may include an additive in addition to the primary constituents of the respective layer. For example, the additive may include at least one of $TiO_2$, $Ta_2O_5$, $HfSiO_4$, an alkali metal oxide, or an alkali earth metal oxide. The additive may be added to relatively dense EBC layer 50, relatively porous EBC layer 52, or both to modify one or more desired properties of the respective layer. For example, the additive components may increase or decrease the reaction rate of the respective layer with CMAS, may modify the viscosity of the reaction product from the reaction of CMAS and the respective layer, may increase adhesion of the respective layer to bond coat 56, may increase or decrease the chemical stability of the respective layer, or the like.

In some examples, relatively dense EBC layer 50, relatively porous EBC layer 52, or both may be substantially free (e.g., free or nearly free) of hafnia and/or zirconia. Zirconia and hafnia may be susceptible to chemical attack by CMAS, so relatively dense EBC layer 50, relatively porous EBC layer 52, or both substantially free of hafnia and/or zirconia may be more resistant to CMAS attack than a respective layer that includes zirconia and/or hafnia.

Regardless of the composition of relatively dense EBC layer 50 and relatively porous EBC layer 52, in some examples, the microstructure of relatively dense EBC layer 50 may be different than the microstructure of relatively porous EBC layer 52. For example, relatively dense EBC layer 50 may include a relatively dense microstructure. Similarly, relatively porous EBC layer 52 may include a relatively porous microstructure, a columnar microstructure, or both. A relatively dense microstructure may include a lower fraction of porosity or voids and thus may be more effective in preventing the infiltration of CMAS and other environmental contaminants compared to a relatively porous microstructure or columnar microstructure. In this way, a relatively dense microstructure may be more resistant to CMAS attack than a relatively porous microstructure or columnar microstructure. Due to the increased volume of pores or voids, a relatively porous microstructure or columnar microstructure may have a lower thermal conductivity, improved strain tolerance, or both, compared to a relatively dense microstructure. In this way, a relatively porous microstructure of columnar microstructure may have improved resistance to thermal loading, thermal cycling, or both than a relatively dense microstructure or non-columnar microstructure. In some examples, an EBC layer with a relatively dense microstructure may have a porosity of less than about 10 vol. %, such as less than about 8 vol. %, less than about 5 vol. %, or less than about 2 vol. %, where porosity may be measured, for example, using Archimedean method per ASTM B962-15, as a percentage of pore volume divided by total volume of the respective layer. In some examples, an EBC layer with a porous microstructure may have a porosity of more than about 10 vol. %, such as more than about 15 vol. %, more than 20 vol. %, or more than about 30 vol. %, where porosity may be measured, for example, using Archimedean method per ASTM B962-15, as a percentage of pore volume divided by total volume of the EBC layer.

Hybrid coating layer 48 may be formed on surface 58 of bond coat 56 using, for example, thermal spraying, including air plasma spraying, low pressure plasma spray, liquid precursor plasma spray, suspension plasma spraying, high velocity oxy-fuel (HVOF) spraying; PVD, including PS-PVD; slurry process deposition; electrophoretic deposition; or the like. In some examples, relatively dense EBC layer 50 may be formed on surface 58 using a coating device (e.g., a thermal spray gun) having (e.g., operated by) a first set of spray parameters and relatively porous EBC layer 52 may be formed on surface 58 using the same coating device having a second set of spray parameters. For example, a first set of spray parameters may result in a dense microstructure of relatively dense EBC layer 50, and a second set of spray parameters may result in a porous microstructure of relatively porous EBC layer 52. Spray parameters may include, but are not limited to, spray gun power, spray gun carrier gas flowrate, stand-off distance of the spray gun, orientation of the spray gun, translational speed of the spray gun, path(s) of travel of the spray gun, coating feedstock material particle size, feed rate of fugitive material, and feed rates of co-feed coating materials.

In some examples, the first and second spray parameters may be selected to enable transition from the first spray parameter to the second spray parameters without significant alteration to a coating system, significant downtime of a coating system, or both. For example, a coating application system may be configured to transition from first spray parameters to second spray parameters without coating application rate reduction, e.g., without substantially reducing material feed, carrier gas feed, energy feed, or the like. In this way, forming relatively dense EBC layer 50 with a first set of spray parameters and forming relatively porous EBC layer 52 with a second set of spray parameters may reduce manufacturing time, reduce manufacturing expense, or both compared to forming relatively dense EBC layer 50 and relatively porous EBC layer 52 by other means.

Figure 3:
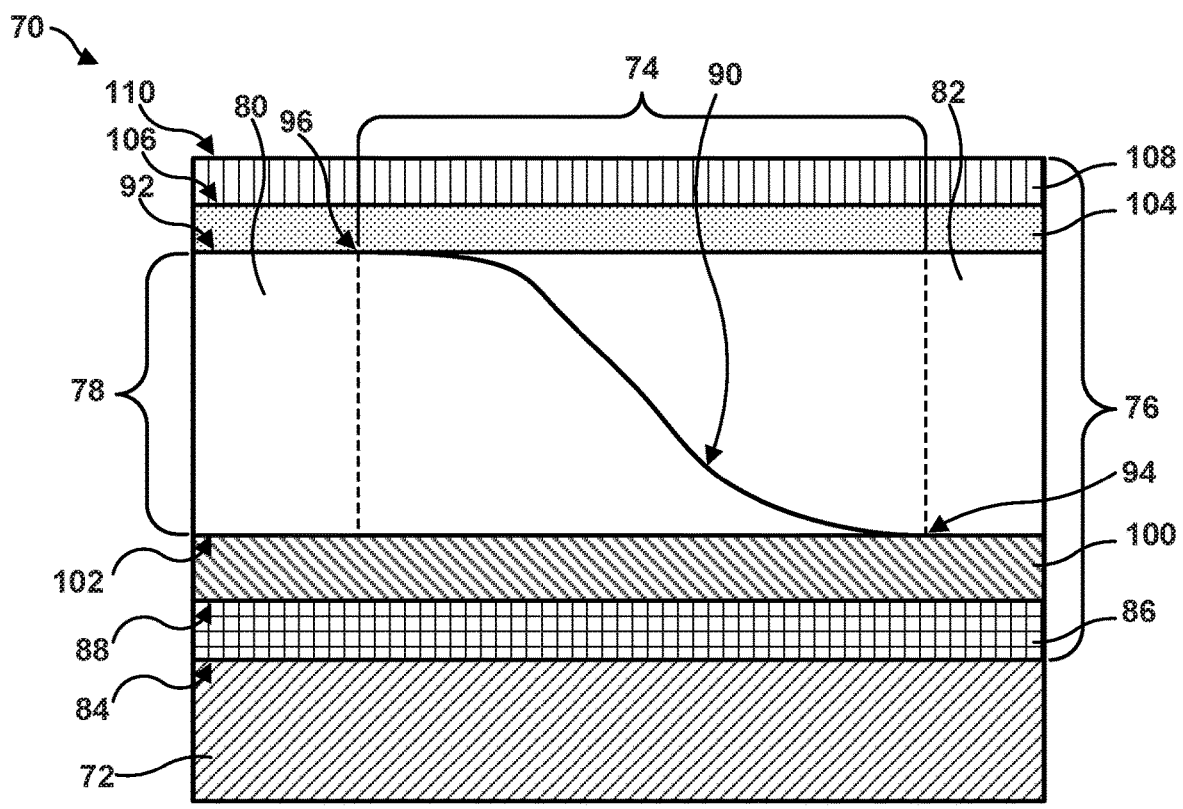
FIG. 3 is a conceptual and schematic diagram illustrating a cross-sectional view of an example article including a substrate, an overlap region of a hybrid coating system, and additional coating layers.

As described above, the EBC layer may be used as a single hybrid coating layer 48 or may be used in combination with at least one other layer, such as an abradable layer, an impurity barrier layer, a TBC layer, or the like. FIG. 3 is a conceptual and schematic diagram illustrating a cross-sectional view of an example article 70 including a substrate 72, an overlap region 74 of a hybrid coating system 76 with additional coating layers 100, 104, and 108. Article 70 may be the same as or substantially similar to article 40 of FIG. 2, except for the differences described herein. For example, like article 40, article 70 includes a substrate 72 defining a surface 84, an optional bond coat 86 defining a surface 88, and a hybrid coating layer 78. Substrate 72, optional bond coat 86, and hybrid coating layer 78 may be the same as or substantially similar to substrate 42, optional bond coat 56, and hybrid coating 48, respectively, as discussed above with respect to FIG. 2. For example, hybrid coating layer 78 includes a relatively porous EBC layer 82 that overlaps at least a portion of a relatively dense EBC layer 80 in an overlap region 74 and defines an interface 90 and surface 92.

Unlike article 40, article 70 includes one or more additional coating layers 100, 104, and 108. Additional coating layers 100, 104, and 108 may define, respectively, surfaces 102, 106, and 110. Additional coating layers 100, 104, and 108 may include an abradable layer, a second bond coat layer, an impurity barrier layer, a TBC layer, or the like. For example, additional coating layer 100 may include a second bond coat layer or an impurity barrier layer. In examples in which additional coating layer 100 includes a second bond coat, the second bond coat may be substantially similar to bond coat 56 described above. For example, the adherence provided by second bond coat between bond coat 86 and hybrid coating layer 78 may be greater than the adherence between bond coat 86 and hybrid coating layer 78, without second bond coat.

In examples in which additional coating layer 100 includes an impurity barrier layer, the impurity barrier layer may inhibit the migration of impurities from substrate 72 into outer layers of hybrid coating system 76. For example, a coating material of impurity barrier layer (e.g., silicon carbide, silicon nitride, and the like) may be selected to interact with, or otherwise impede the migration of impurities, such as boron, from substrate 72 into outer layers of hybrid coating system 76. The diffusion rate of boron in an impurity barrier layer (e.g., SiC or SiN) may less than the diffusion rate in silicon due to the presence of point defects in the impurity barrier layer. As another example, vacancy related diffusion of boron in the impurity barrier layer (e.g., SiC or SiN) may have a higher activation energy than vacancy related diffusion of boron in silicon. In this way, an impurity barrier layer may reduce the migration of impurities from substrate 72 into outer layers of hybrid coating system 76. In some examples, impurity barrier layer may be disposed directly on surface 84 of substrate 72 and bond coat 86 may be disposed on a surface of the impurity barrier layer.

In some examples, additional coating layers 104 and/or 108 may include an abradable layer. Abradability may include a disposition to break into relatively small pieces when exposed to a sufficient physical force. Abradability may be influenced by the material characteristics of the abradable layer, such as fracture toughness and fracture mechanism (e.g., brittle fracture), as well as the porosity of the abradable layer. Thermal shock resistance and high temperature capability may be important for use in a gas turbine engine, in which the abradable layer is exposed to wide temperature variations from high operating temperatures to low environmental temperatures when the gas turbine engine is not operating. In addition to at least some of the above properties, the abradable layer may possess other properties.

The abradable layer may include any suitable material, such as any of the materials described above with respect to relatively dense EBC layer 50 or relatively porous EBC layer 52. The abradable layer may be porous. Porosity of the abradable layer may reduce a thermal conductivity of the abradable layer and/or may affect the abradability of the abradable layer. In some examples, the abradable layer includes porosity between about 10 vol. % and about 50 vol. %. In other examples, the abradable layer includes porosity between about 15 vol. % and about 35 vol. %, or about 20 vol. %. Porosity of the abradable layer is defined herein as a volume of pores or cracks in the abradable layer divided by a total volume of the abradable layer (including both the volume of material in the abradable layer and the volume of pores/cracks in the abradable layer).

The abradable layer may be formed using, for example, a thermal spraying technique, such as, for example, plasma spraying. Porosity of the abradable layer may be controlled using coating material additives and/or processing techniques to create the desired porosity. In some examples, substantially closed pores may be desired.

For example, a coating material additive that melts or burns at the use temperatures of the component (e.g., a blade track) may be incorporated into the coating material that forms the abradable layer. The coating material additive may include, for example, graphite, hexagonal boron nitride, or a polymer such as a polyester, and may be incorporated into the coating material prior to deposition of the coating material over substrate 72 to form the abradable layer. The coating material additive then may be melted or burned off in a post-formation heat treatment, or during operation of the gas turbine engine, to form pores in the abradable layer. The post-deposition heat-treatment may be performed at up to about 1500° C.

The porosity of the abradable layer can also be created and/or controlled by plasma spraying the coating material using a co-spray process technique in which the coating material and coating material additive are fed into the plasma stream with two radial powder feed injection ports. The feed pressures and flow rates of the coating material and coating material additive may be adjusted to inject the material on the outer edge of the plasma plume using direct 90-degree angle injection. This may permit the coating material particles to soften but not completely melt and the coating material additive to not burn off but rather soften sufficiently for adherence in the abradable layer.

In some examples, additional coating layers 104 and/or 108 may include may include a TBC layer. The TBC may have a low thermal conductivity (i.e., both an intrinsic thermal conductivity of the material(s) that forms the TBC and an effective thermal conductivity of the TBC as constructed) to provide thermal insulation to substrate 72, bond coat 86, hybrid coating layer 78, and/or additional coating layer 100. Heat is transferred through the TBC through conduction and radiation. The inclusion of rare earth oxides such as ytterbia, samaria, lutetia, scandia, ceria, gadolinia, neodymia, europia, yttria-stabilized zirconia (YSZ), zirconia stabilized by a single or multiple rare earth oxides, hafnia stabilized by a single or multiple rare earth oxides, zirconia-rare earth oxide compounds, such as $RE_2Zr_2O_7$ (where RE is a rare earth element), hafnia-rare earth oxide compounds, such as $RE_2Hf_2O_7$ (where RE is a rare earth element), and the like as dopants may help decrease the thermal conductivity (by conduction) of the TBC.

In some examples, additional coating layers 100, 104, and/or 108 may include may include additional hybrid coating layers the same or substantially similar to hybrid coating layer 78 and/or hybrid coating layer 48 discussed above.

Figure 4:
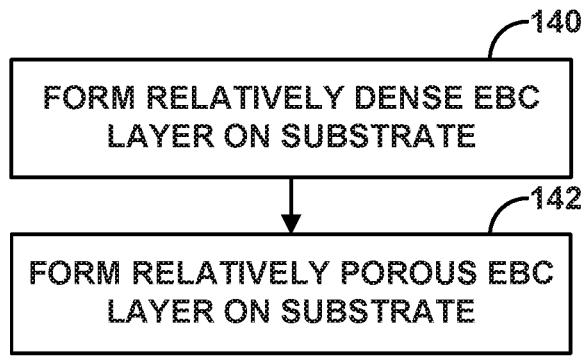
FIG. 4 is a flow diagram of an example technique for applying a hybrid coating.

Generally, hybrid coating layer 78 (and hybrid coating layer 48) may be applied by any suitable coating technique. FIG. 4 is a flow diagram of an example technique for applying a hybrid coating. Although the technique of FIG. 4 will be described with respect to article 40 of FIG. 2, in other examples, the technique of FIG. 4 may be used to form different articles including, but not limited to, article 10 of FIG. 1 and article 70 of FIG. 3. Additionally, articles 10, 40, and 70 may be formed using other techniques for applying a hybrid coating to a component.

The technique illustrated in FIG. 4 includes forming a relatively dense EBC layer 50 on substrate 42 (e.g., surface 54 of substrate 42 or surface 58 of bond coat 56) (140). In some examples, forming the relatively dense EBC layer (140) may include applying, with a coating device having a first set of spray parameters, an EBC coating material to a first portion of the substrate. In some examples, the first portion of the substrate may include the pressure side of an airfoil (e.g., pressure side 32).

In some examples, a first set of spray parameters may include a first stand-off distance of the coating device. The first stand-off distance includes the distance between the coating device and the substrate. Applying an EBC coating material at the first stand-off distance may result in a relatively dense microstructure. For example, applying an EBC coating material from the first stand-off distance may result in the coating material contacting the substrate at a higher temperature, greater velocity, or both compared to applying coating material from a greater stand-off distance. The higher temperature, greater velocity, or both may result in a relatively dense microstructure compared to a coating applied from a greater stand-off distance. In some examples, the coating device may transition from the first stand-off distance to a second different stand-off distance while continuing to apply the EBC coating material, which may result in increasing porosity in the EBC.

Additionally or alternatively, a first set of spray parameters may include a first particle size of an EBC coating material. For example, forming relatively dense EBC layer 50 (140) may include applying, with the coating device, a relatively fine particle size EBC coating material to the first portion of substrate 42. A relatively fine particle size EBC coating material may result in a relatively dense microstructure. For example, relatively fine particles of an EBC coating material may melt more completely, stay melted longer, or both, compared to relatively coarser particles of an EBC coating material. By melting more completely or remaining melted, the relatively fine particles may form a relatively dense EBC layer 50. In some examples, the relatively fine particle size EBC coating material may include a particle size distribution between about 5 micron and about 45 micron.

In some examples, forming relatively dense EBC layer 50 on substrate 42 may optionally include masking at least a portion of substrate 42. Masking may include applying tape or any other suitable masking material to a portion of substrate 42 near overlap region 44. For example, a first masking material layer (e.g., a contact mask) may be removably applied to surface 58 (e.g., extending in the plane of the page) directly to the right of first position 64. By masking surface 58 directly to the right of first position 64, relatively dense EBC layer 50 will only be applied to the left of first position 64.

In some examples, masking may include shadow masking. For example, a second masking material layer (e.g., a shadow mask) may be removably applied to the first masking material layer described above. The second masking material layer may overhang at least a portion of the first masking material layer. For example, at least a portion of the second masking material may protrude into the overlap region 44 above, and not in contact with, surface 58. By shadow masking with the second masking material layer, EBC coating material applied near overlap region 44 may form a taper from surface 58 to surface 62 (e.g., a feather band).

The technique illustrated in FIG. 4 also includes forming relatively porous EBC layer 52 on substrate 42 (e.g., surface 54 of substrate 42 or surface 58 of bond coat 56) (142). At least a portion of relatively porous EBC layer 52 may overlap at least a portion of relatively dense EBC layer 50 in overlap region 44. For example, forming relatively porous EBC layer 52 on substrate 42 may include applying, with the coating device having a second different set of spray parameters, the same or substantially similar EBC coating material to a second portion of the substrate. In some examples, the second portion of the substrate may include the suction side of an airfoil (e.g., suction side 30).

In some examples, a second set of spray parameters may include a second stand-off distance of the coating device. The second stand-off distance may be greater than the first stand-off distance. Applying an EBC coating material at the second stand-off distance may result in a relatively porous microstructure. For example, applying a coating material from the second stand-off distance may result in the EBC coating material contacting the substrate at a lower temperature, lower velocity, or both compared to applying coating material from a lesser stand-off distance. The lower temperature, lower velocity, or both may result in a relatively porous microstructure compared to a coating applied from a smaller stand-off distance.

In some examples, forming relatively porous EBC layer 52 on substrate 42 (142) may include applying, with the coating device, the same or substantially similar EBC coating material (e.g., as used for forming relatively dense EBC layer 50 (140)) and a fugitive material to the second portion of the substrate. For example, the coating device may include a dual powder feeding system, e.g., configured to feed both an EBC coating material and a fugitive material to a spray gun. The fugitive material may at least partially evaporate after the EBC coating material contacts substrate 42. For example, the at least partially evaporated fugitive material may form evaporation entrails through at least a portion of the EBC coating material. By forming evaporation entrails, the fugitive material may form at least a portion of the pores of the relatively porous EBC layer. Example fugitive materials may include, for example, polyester, graphite, or the like.

Additionally or alternatively, a second set of spray parameters may include a second particle size of an EBC coating material. For example, forming relatively porous EBC layer 52 (140) may include applying, with the coating device, a relatively coarser particle size EBC coating material to the second portion of substrate 42. A relatively coarse particle size EBC coating material may result in a relatively porous microstructure. For example, relatively coarse particles of a relatively coarser particle size EBC coating material may not completely melt, may solidify faster, or both, compared to relatively fine particle size EBC coating material. By not completely melting or solidifying faster, applying, with the coating device, the relatively coarse particles may form a relatively porous EBC layer 52. In some examples, the relatively coarse particle size EBC coating material may include a particle size distribution between about 25 micron and about 125 micron. The size of the relatively coarse particles used to form relatively porous EBC layer 52 may be greater than the size of relatively fine particles used to form relatively dense EBC layer 50.

In some examples, forming relatively porous EBC layer 52 may include, as discussed above, masking and/or shadow masking at least a portion of relatively dense EBC layer 50. In some examples, a first masking material may be removably applied to surface 62 (e.g., extending in the plane of the page) directly to the left of second position 66. By masking surface 58 directly to the left of second position 66, relatively dense EBC layer 50 will only be applied to the right of second position 66. Additionally, a second masking material layer may be removably applied to the first masking material layer and overhang at least a portion of the first masking material layer to protrude into the overlap region 44 above, and not in contact with, interface 60. By shadow masking with the second masking material layer, EBC coating material applied near overlap region 44 may form a taper from surface 62 to surface 58 (e.g., a feather band). In this way, hybrid coating layer 48 may include a substantially smooth transition in overlap region 44 (e.g., substantially symmetric overlapping tapers of relatively dense EBC layer 50 and relatively porous EBC layer 52 with a substantially uniform coating thickness) and/or the thickness of hybrid coating layer 48 may be substantially constant in overlap region 44.

Figure 5:
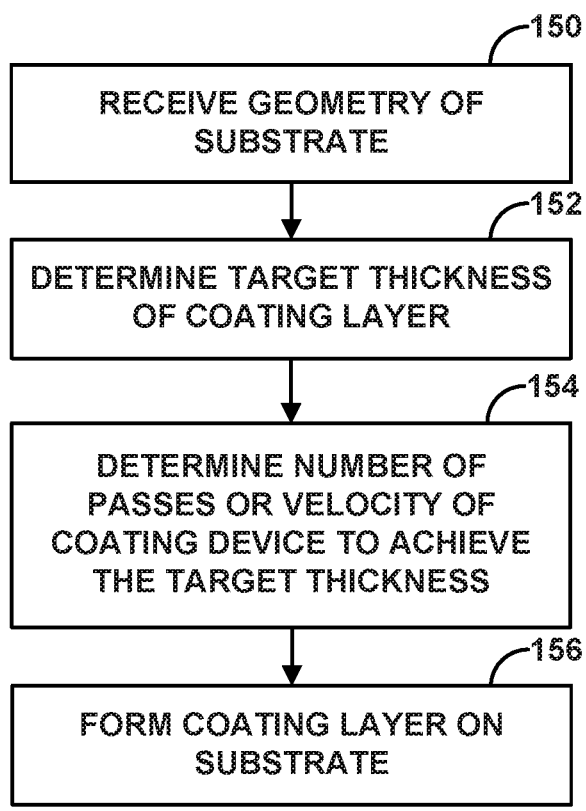
FIG. 5 is a flow diagram of an example technique for controlling the application of a hybrid coating.

In some examples, forming relatively dense EBC 50, relatively porous EBC layer 52, or both on substrate 42 (142) may include controlling a thickness of a coating applied to an article. FIG. 5 is a flow diagram of an example technique for controlling a thickness of a coating applied to an article. In some examples, system and technique for controlling the thickness of the coating may be the same as or substantially similar to the systems and techniques as described in U.S. Patent Application No. 62/541,394 by Bourne et al., the contents of which is incorporated by reference herein in its entirety. Although the technique of FIG. 5 will be described with respect to article 40 of FIG. 2, in other examples, the technique of FIG. 5 may be used to form different articles including, but not limited to, article 10 of FIG. 1 and article 70 of FIG. 3. Additionally, articles 10, 40, and 70 may be formed using other techniques for controlling a thickness of a coating applied to a component.

The technique illustrated in FIG. 5 includes receiving, by a computing device, a geometry of substrate 42 (150). In some examples, the computing device may include a desktop computer, a laptop computer, a tablet computer, a workstation, a server, a mainframe, a cloud computing system, a robot controller, or the like. The computing device may be configured to control operation of a coating system, including, for example, a stage and a mount for securing the article to be coated, a measuring device to measure a surface geometry of the article, and/or a coating device for applying a coating. The computing device may be communicatively coupled to the stage, the mount, the measuring device, and/or the coating device using respective wired and/or wireless communication connections, e.g., a network link, such as Ethernet or other network connections, USB, IEEE 1394, or the like. In some examples, the geometry of substrate 42 may include a plurality of locations on surface 54, surface 58 (e.g., after application of bond coat 56) or surface 62 to second position 66, interface 60, and surface 58 from first position 64 (e.g., after application of relatively dense EBC layer 50 to bond coat 56). In some examples, receiving the geometry of substrate 42 may include determining, by a computing device, data representative of the three-dimensional surface geometry (e.g., geometry) from a measuring device. The measuring device may include, for example, a coordinate measuring machine ("CMM") (e.g., the CMM probe may be mechanical, optical, laser, or the like), a structured-light three-dimensional scanner, another non-contacting optical measurement device; digital image correlation, photogrammetry, or the like. In this way, the geometry may include three-dimensional coordinates of a plurality of locations of a surface of substrate 42.

After receiving the data representative of the geometry of the substrate 42, the technique illustrated in FIG. 5 includes determining, by the computing device, a respective target thickness of the coating layer (e.g., relatively dense EBC layer 50, relatively porous EBC layer, or both) for each respective location of the plurality of locations based on a target article geometry and the geometry of substrate 42 (152). In some examples, the respective target thickness may be based on a target coated article geometry and the measured geometry of substrate 42. For example, the target coated article geometry may include a combined thickness of the relatively dense EBC layer and the relatively porous EBC layer in the overlap region being substantially constant, a shape (e.g., profile) of interface 60, a total thickness of hybrid EBC coating 48, or the like. In some examples, the technique may include determining, by the computing device, for each respective location of the plurality of locations (which represent points on the surface(s) of article 40 (e.g., a respective x-, y-, z-axis coordinate in a three-coordinate system)), a difference between the measured geometry of article 40 and a target geometry. In some examples, determining the difference between the measure geometry of article 40 and a target geometry may include registering, by the computing device, the measured geometry of article 40 to the target geometry, to facilitate determining the differences between the measured geometry of article 40 and the target geometry for each location. In some examples, the computing device, may determine the respective difference for each respective location of the plurality of locations in a direction substantially normal to the measured surface of article 40 at the respective location.

After determining the target thickness, the technique illustrated in FIG. 5 also includes determining, by the computing device, a number of passes of a coating device for each respective location, a velocity that the coating device will travel over each respective location, or both to achieve the respective target thickness of relatively dense EBC layer 50, relatively porous EBC layer 52, or both for each respective location (154). For example, the computing device may determine at least one coating device path, which defines the motion of the coating device relative to article 40 for coating at least a portion of article 40. The coating program for coating article 40 may include at least one coating device path, such as a plurality of coating device paths. A first respective path of the plurality of paths may direct a coating material to the same portion, different portions, or one or more overlapping portions of article 40, compared to other respective paths of the plurality of paths.

In some examples, the number of passes over each location may be based on a predetermined template coating program. In some examples, the predetermined template program may define parameters for a coating process and may be experimentally verified. In some examples, each of these parameters may be fixed, and only the number of passes and the velocity of the coating device relative to article 40 may be changed by the computing device. In some examples, the predetermined template program may include a plurality of subroutines. In some examples, a computing device may adjust one or more parameters of the predetermined template program or parameters of a coating process to arrive at a coating program for applying a coating to substantially achieve the target geometry for article 40. For example, the computing device may determine a respective number of passes of a coating device for each location of article 40, e.g., a respective number of times each respective subroutine of a predetermined template program is to be executed or performed (e.g., a subroutine count). Additionally or alternatively, the computing device may determine a velocity of the coating device relative to article 40 for each respective location of article 40, e.g., a respective velocity for each respective subroutine of the coating device. In this way, in some examples, the technique may include determining, by the computing device, a number of passes of the coating device with respect to each location of article 40, a velocity of the coating device with respect to each location of article 40, or both, in order to determine a coating program for applying a coating to substantially achieve the target geometry of article 40.

After determining the number of passes of a coating device for each respective location and/or the velocity that the coating device will travel over each respective location to achieve the respective target thickness of relatively dense EBC layer 50, relatively porous EBC layer 52, or both for each respective location, the technique illustrated in FIG. 5 includes forming relatively dense EBC layer 50, relatively porous EBC layer 52, or both on the substrate (156). For example, forming relatively dense EBC layer 50, relatively porous EBC layer 52, or both on the substrate includes controlling a coating device to apply an EBC coating material to the substrate using the determined number of passes and/or velocity of the coating device to achieve the target coating thickness. In some example, the technique illustrated in FIG. 5 may be used to apply other layers, such as bond coat 56 and/or additional layers 100, 104, or 108. In this way, the technique illustrated in FIG. 5 may be used to apply a hybrid coating system 46 having a substantially smooth transition in overlap region 44 (e.g., substantially symmetric overlapping tapers of relatively dense EBC layer and relatively porous EBC layer 52 with a substantially uniform coating thickness) and/or the thickness of hybrid coating layer 48 may be substantially constant in overlap region 44.

Various examples have been described. These and other examples are within the scope of the following claims.

What is claimed is:

1. A turbine blade for a gas turbine engine, the turbine blade comprising:
   a substrate comprising an airfoil having a leading edge, a suction side and a pressure side, each of the suction side and the pressure side extending from a stagnation point toward a trailing edge of the airfoil; and
   a hybrid environmental barrier coating (EBC) on the substrate, the hybrid EBC comprising:
      a first EBC layer having a first porosity; and
      a second EBC layer having a second porosity, wherein the second porosity is greater than the first porosity, wherein at least a portion of the second EBC layer overlaps at least a portion of the first EBC layer in an overlap region between the stagnation point and an aerodynamic throat of the airfoil, wherein the first EBC layer extends from the overlap region, over the leading edge over the airfoil and along the pressure side, and wherein the second EBC layer extends from the overlap region along the suction side.

2. The turbine blade of claim 1, wherein the hybrid EBC further comprises a bond layer between the substrate and at least one of the first EBC layer or the second EBC layer.

3. The gas turbine blade of claim 2, further comprising an additional coating layer,
   wherein at least one of the first EBC layer or the second EBC layer is disposed between the substrate and the additional coating layer.

4. The turbine blade of claim 1, wherein a thickness of the hybrid EBC is substantially constant in the overlap region.

5. The turbine blade of claim 1, wherein a width of the overlap region is between 0.3 millimeters and 13.0 millimeters.

6. The turbine blade of claim 1, wherein the first EBC layer and the second EBC layer comprise the same EBC coating material.

7. A turbine blade for a gas turbine engine comprising:
   an airfoil, wherein the airfoil comprises a leading edge, a suction side and a pressure side;
   a hybrid environmental barrier coating (EBC) on the airfoil, the hybrid EBC comprising:
      a first EBC layer defining a first porosity on at least a portion of the pressure side and extending over the leading edge onto at least a portion of the suction side; and
      a second EBC layer defining a second porosity on at least a portion of the suction side, wherein at least a portion of the second EBC layer overlaps at least a portion of the first EBC layer in an overlap region, wherein the overlap region is between a point of stagnation and an aerodynamic throat of the airfoil, and
      wherein the first porosity is less than the second porosity.

8. The turbine blade of claim 7, further comprising a bond layer between the airfoil and at least one of the first EBC layer and the second EBC layer.

9. The gas turbine blade of claim 8, wherein a bond coat is disposed between the hybrid EBC and the airfoil, and
   the hybrid EBC is disposed between the airfoil and an additional coating layer.

10. The turbine blade of claim 7, wherein a thickness of the hybrid EBC in the overlap region is substantially constant.

11. The turbine blade of claim 7, wherein a width of the overlap region is between 0.3 millimeters and 13.0 millimeters.

12. The turbine blade of claim 7, wherein the first EBC layer and the second EBC layer comprise the same EBC coating material.

\* \* \* \* \*